(12) United States Patent
Freet

(10) Patent No.: US 9,180,821 B1
(45) Date of Patent: Nov. 10, 2015

(54) BICYCLE CARRIER

(71) Applicant: Robert W Freet, Willow Hill, PA (US)

(72) Inventor: Robert W Freet, Willow Hill, PA (US)

( * ) Notice: Subject to any disclaimer, the term of this patent is extended or adjusted under 35 U.S.C. 154(b) by 0 days.

(21) Appl. No.: 14/711,500

(22) Filed: May 13, 2015

Related U.S. Application Data

(60) Provisional application No. 61/992,967, filed on May 14, 2014.

(51) Int. Cl.
  *B60R 9/10* (2006.01)
  *B60R 9/048* (2006.01)
  *B60R 9/08* (2006.01)
  *B60R 9/06* (2006.01)

(52) U.S. Cl.
  CPC . *B60R 9/10* (2013.01); *B60R 9/048* (2013.01); *B60R 9/06* (2013.01); *B60R 9/08* (2013.01)

(58) Field of Classification Search
  CPC .............. B60R 9/06; B60R 9/10; B60R 9/00; B60R 9/08; B60R 9/048
  See application file for complete search history.

(56) References Cited

U.S. PATENT DOCUMENTS

| | | | | |
|---|---|---|---|---|
| 3,765,581 A * | 10/1973 | Kosecoff | | 224/500 |
| 3,796,333 A * | 3/1974 | Goldstein | | 414/462 |
| 4,629,104 A * | 12/1986 | Jacquet | | 224/324 |
| 4,676,414 A * | 6/1987 | Deguevara | | 224/535 |
| 5,067,641 A * | 11/1991 | Johnson et al. | | 224/501 |
| 5,096,102 A * | 3/1992 | Tolson | | 224/513 |
| 5,190,195 A * | 3/1993 | Fullhart et al. | | 224/497 |
| 5,303,857 A * | 4/1994 | Hewson | | 224/506 |
| 5,460,304 A * | 10/1995 | Porter et al. | | 224/521 |
| 5,469,997 A * | 11/1995 | Carlson | | 224/521 |
| 5,476,203 A * | 12/1995 | Fletcher | | 224/536 |
| 5,526,971 A * | 6/1996 | Despain | | 224/519 |
| 5,527,146 A * | 6/1996 | Allsop et al. | | 414/462 |
| 5,549,231 A * | 8/1996 | Fletcher et al. | | 224/536 |
| 5,685,686 A * | 11/1997 | Burns | | 414/462 |
| 6,234,372 B1* | 5/2001 | Rivera | | 224/536 |
| 6,523,731 B1* | 2/2003 | Pedrini | | 224/537 |
| 6,626,340 B1* | 9/2003 | Burgess | | 224/536 |
| 6,644,525 B1* | 11/2003 | Allen et al. | | 224/497 |
| 8,418,902 B2* | 4/2013 | Cha et al. | | 224/496 |
| 2003/0042281 A1* | 3/2003 | Ishikura | | 224/319 |
| 2004/0004099 A1* | 1/2004 | Crouch | | 224/499 |
| 2005/0082329 A1* | 4/2005 | Cohen | | 224/519 |
| 2008/0006667 A1* | 1/2008 | Bergerhoff et al. | | 224/533 |
| 2008/0164292 A1* | 7/2008 | Farney | | 224/324 |
| 2009/0261136 A1* | 10/2009 | Skoff | | 224/519 |

* cited by examiner

*Primary Examiner* — Brian D Nash

(57) ABSTRACT

A bicycle rack that allows multiple bicycles to be secured in a fanned out position includes a mounting section, a main body, and a plurality of bicycle-receiving subassemblies. The mounting section provides a means for supporting the main body and attaching the bicycle rack to a vehicle, while the main body supports the plurality of bicycle-receiving subassemblies. Each of the plurality of bicycle-receiving subassemblies includes a frame-receiving cradle, a first pedal-receiving clamp, a second pedal-receiving clamp, and a pedal arm. The frame-receiving cradle provides a telescoping structure for supporting the down tube of a bicycle, while the first pedal-receiving clamp and the second pedal-receiving clamp provide a means for supporting the pedals of the bicycle, wherein the pedal arm offsets the second pedal-receiving clamp from the first pedal-receiving clamp. The main body includes a primary beam and a secondary beam; the secondary beam being detachable when fewer bicycles are transported.

20 Claims, 11 Drawing Sheets

US 9,180,821 B1

BICYCLE CARRIER

The current application claims a priority to the U.S. Provisional Patent application Ser. No. 61/992,967 filed on May 14, 2014.

FIELD OF THE INVENTION

The present invention relates generally to bicycle carriers. More specifically, the present invention is a bicycle rack that holds bicycles in a fanned out manner to prevent the bicycles from contacting with and causing damage to each other

BACKGROUND OF THE INVENTION

In the modern world bicycles are utilized by many people as a form of transportation, a hobby, or even a means of exercise. Bicycles, in relation to motor vehicles, are inexpensive, less polluting, and a respectable means of exercise. Different individuals find bicycles appealing for some of these reasons or other reasons. While the result is a large number of persons who own a bicycle, this also creates a need for bicycle friendly transportation. While some will rarely, if ever, need to transport their bicycle, there are others who will need to transport their bicycle over long distances (perhaps as part of a move, a visit to a more bicycle friendly locale, or because they have a mountain bike which they wish to avoid using on paved surfaces). There are a number of bicycle transporting apparatuses which have been created in response, though not without shortcomings.

One significant issue with current bicycle carriers is that they do not fully immobilize or separate bicycles from each other, the subsequent rattling causing collisions which ultimately result in dents, scrapes, and other damage. This damage is most common in the region of the handlebars, as the handlebars protrude sideways from the bicycle, increasing what is otherwise a slim profile. Without sufficient space, which is difficult when trying to minimize bulk of a bicycle carrier, contact between adjacent bicycles is almost inevitable with existing bicycle carriers. This results in bicycles being destroyed; they hit and rub against each other, pedals collide with and damage spokes of adjacent bicycles, handlebars tear holes in adjacent seats, and paint is scratched off the frame.

It is therefore an object of the present invention to provide a bicycle rack that addresses the above issues by rotating the bicycles with respect to each other, creating a fanned configuration. By using pedal-receiving clamps to secure the pedals, the bicycle can be translated (i.e. moved vertically and horizontally) and rotated by means of a cradle that receives the down tube. By next moving the cradle for each stored bicycle, the handlebars can be offset from each other; the resulting positioning negates the issue of colliding bicycle components and resulting damage to the bicycles. The present invention also sufficiently offsets bicycles from a transporting vehicle, preventing any damage to the vehicle. Additionally, the present invention is simple to use, wherein bicycles can easily be mounted and removed.

DETAIL DESCRIPTIONS OF THE INVENTION

All illustrations of the drawings are for the purpose of describing selected versions of the present invention and are not intended to limit the scope of the present invention.

The present invention is a bicycle rack that allows multiple bicycles to be secured in a fanned out position. The present invention secures the bicycles such that they do not impact each other, minimizing scrapes, bumps, and other wear and tear that normally results from placing multiple bicycles on a traditional bicycle rack. The present invention is provided for use with motor vehicles, being secured to a trailer hitch or similar coupling mount of a vehicle.

Figure 1:
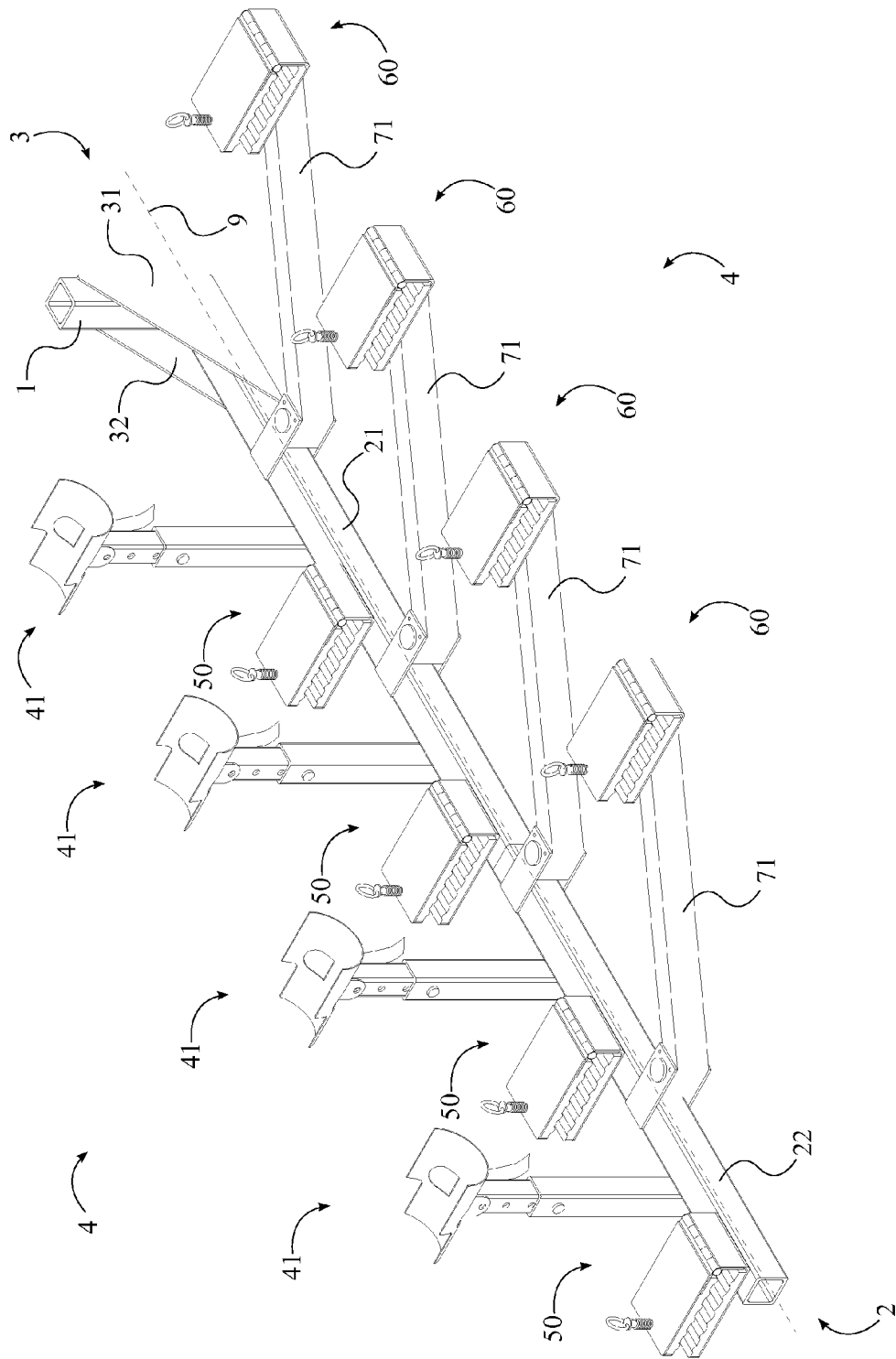
FIG. 1 is a perspective view of the present invention, wherein the secondary beam is attached to the main beam.

In reference to FIG. 1, the present invention comprises a mounting section 1, a main body 2, and a plurality of bicycle-receiving subassemblies 4. The mounting section 1 is provided to couple with a corresponding part of a vehicle, most commonly a hitch. The mounting section 1 thus allows the present invention to be secured to the vehicle. The main body 2 extends away from the mounting section 1; this is done to provide sufficient room for one or more bicycles to be secured along the main body 2, away from the vehicle. The plurality of bicycle-receiving subassemblies 4 is provided to hold one or more bicycles in a secure position, with bracing components provided for each pedal as well as the bicycle frame, i.e. the down tube. These bracing components allow the bicycles to be angled about a longitudinal (with respect to the main body 2) axis 9, effectively "fanning" out the bicycles and preventing collisions between the bicycles during transport.

The mounting section 1 and the main body 2 are preferably square tubes that are positioned perpendicular to each other. In reference to FIG. 4-5, the mounting section 1 is terminally connected to the main body 2, wherein the mounting section 1 is positioned at one end of the main body 2, forming an "L" shape. The mounting section 1 and the main body 2 are adjacently connected to each other by means of a hitch brace 3. The hitch brace 3 is adjacently connected to both the mounting section 1 and the main body 2, and comprises a first plate 31 and a second plate 32. The first plate 31 and the second plate 32 are both adjacently connected to the mounting section 1 and the main body 2, wherein the first plate 31 and the second plate 32 are positioned opposite each other about the mounting section 1 and the main body 2. The positioning of the first plate 31 and the second plate 32 on either side of the mounting section 1 and the main body 2 provides support in order to hold the mounting section 1 and the main body 2 in the "L" shape. The combination and configuration of the mounting section 1 and the main body 2 allows the present invention to be coupled to a vehicle, while providing ample space for receiving and securing bicycles.

Figure 3:
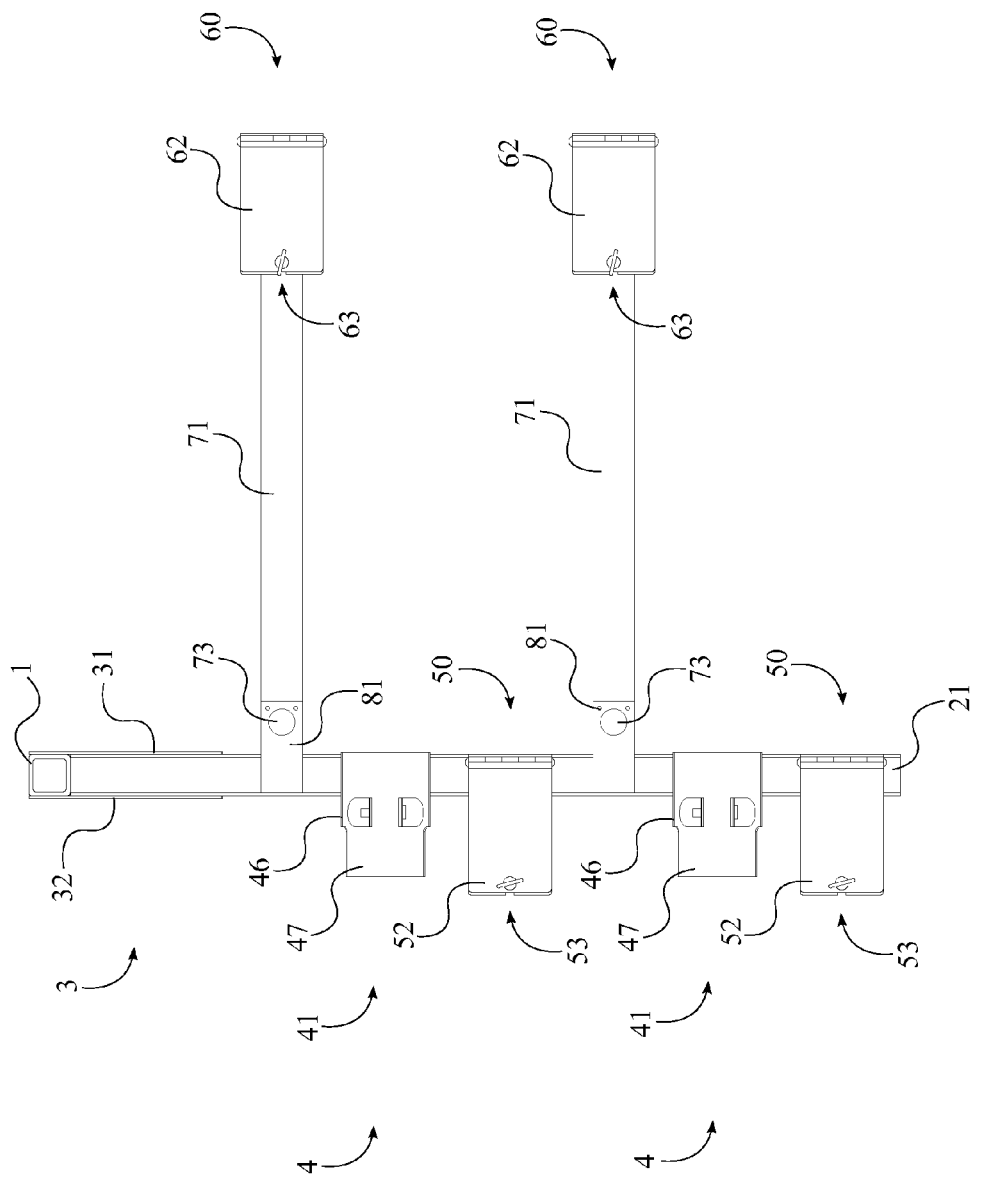
FIG. 3 is a top plan view of the present invention, wherein the pedal arm for each of the plurality of bicycle-receiving subassemblies is fanned out.
Figure 6:
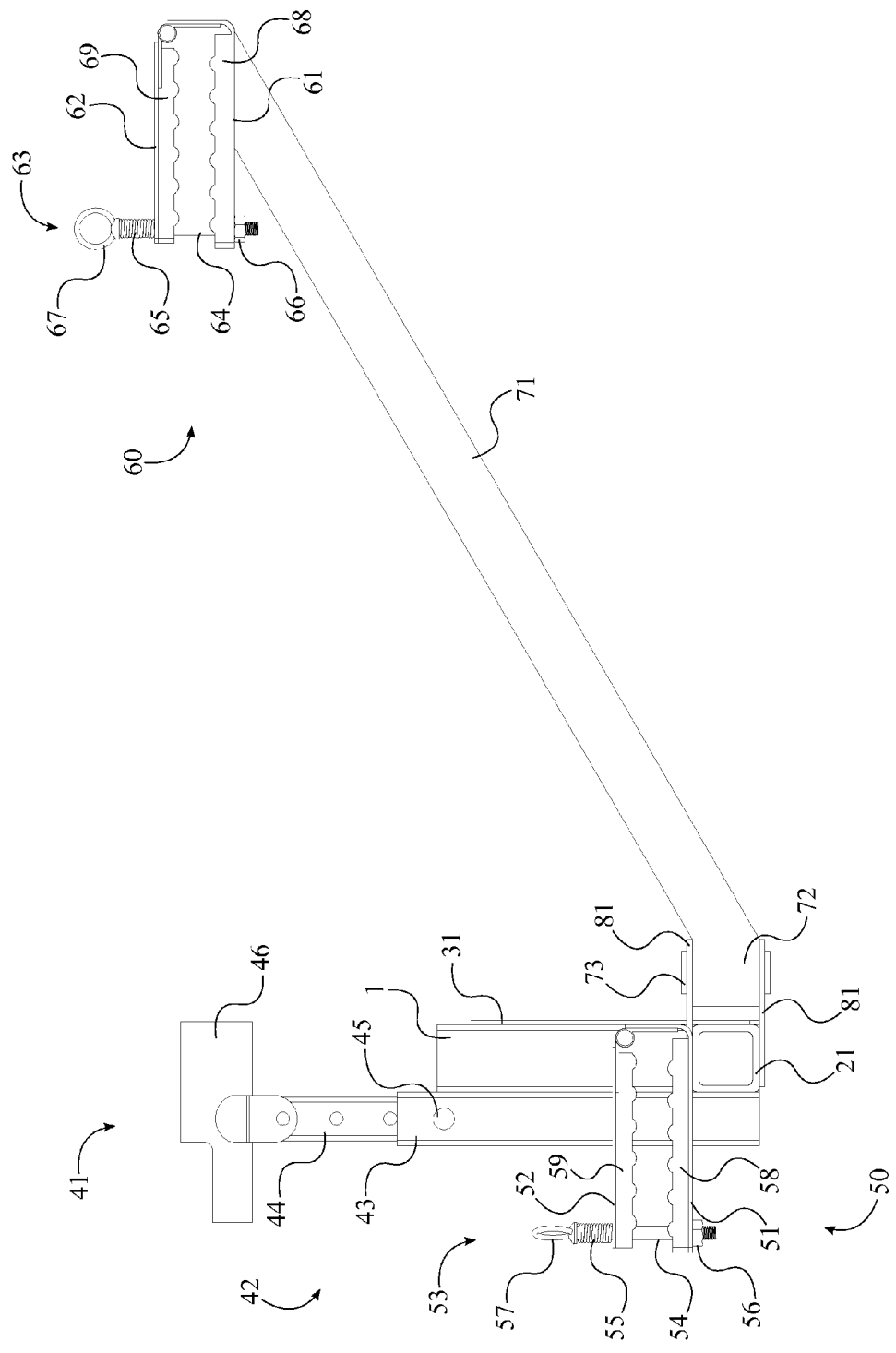
FIG. 6 is a front elevational view of the present invention, wherein the first pedal-receiving clamp and the second pedal-receiving clamp are closed.
Figure 7:
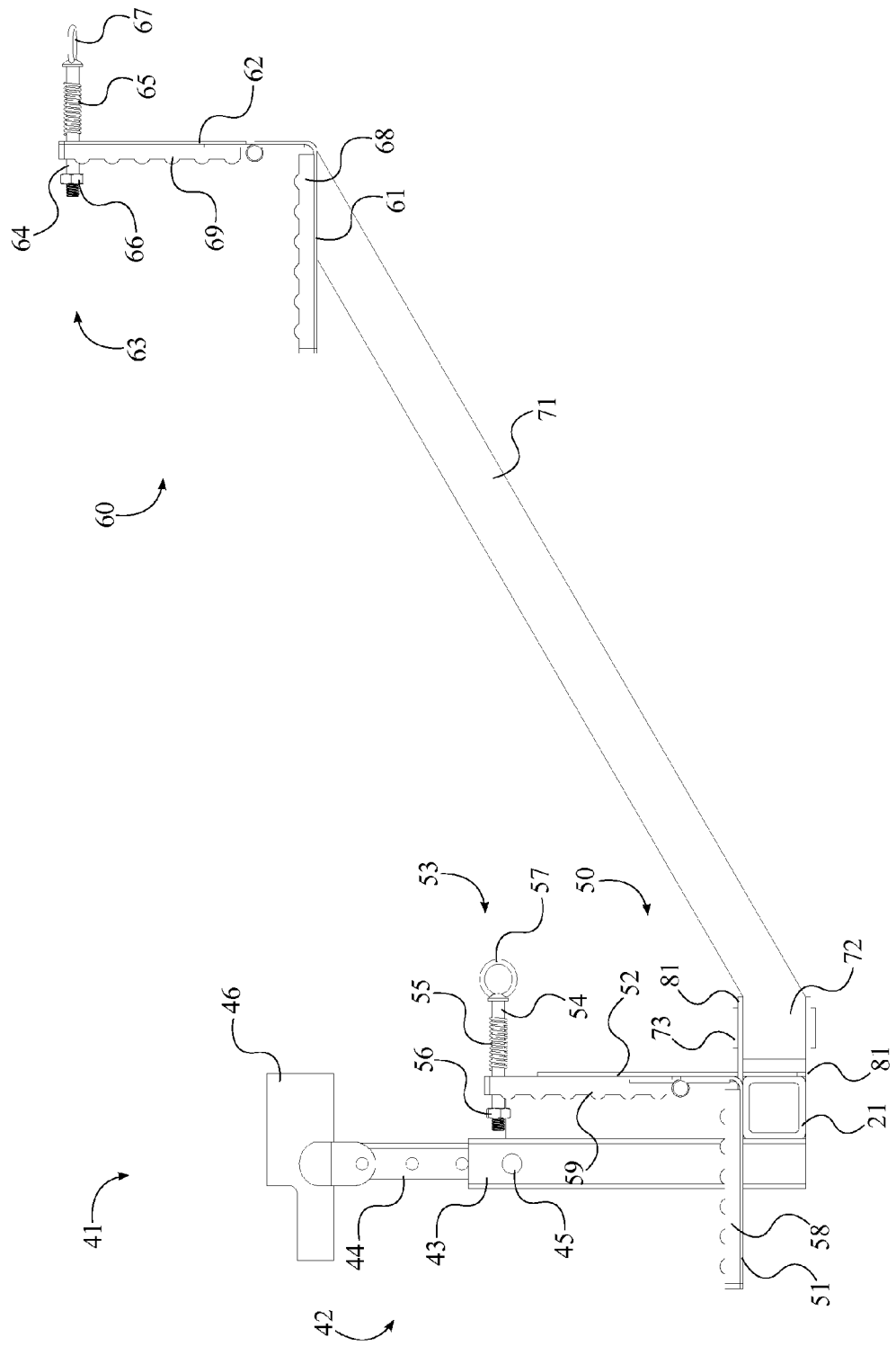
FIG. 7 is a front elevational view thereof, wherein the first pedal-receiving clamp and the second pedal-receiving clamp are open.
Figure 8:
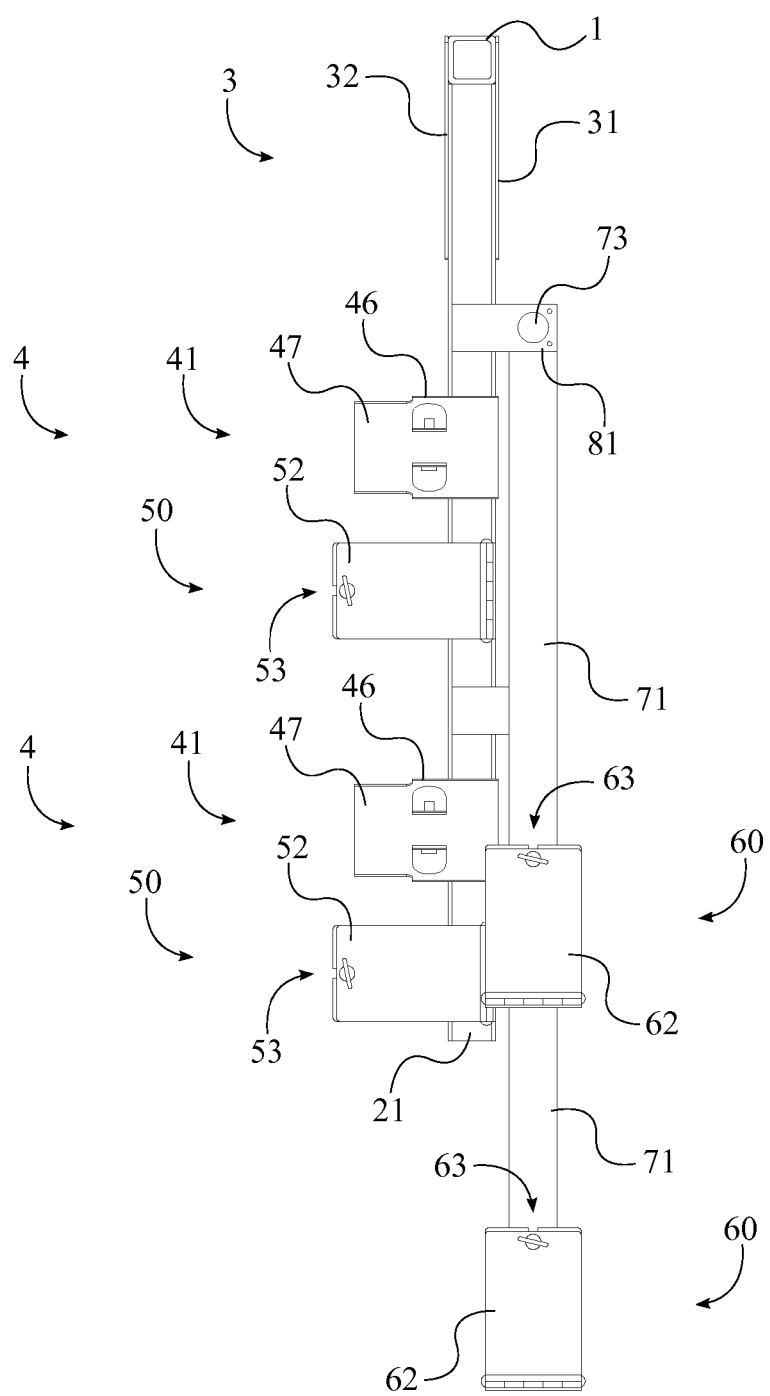
FIG. 8 is a top plan view of the present invention, wherein the pedal arm for each of the plurality of bicycle-receiving subassemblies is retracted.
Figure 9:
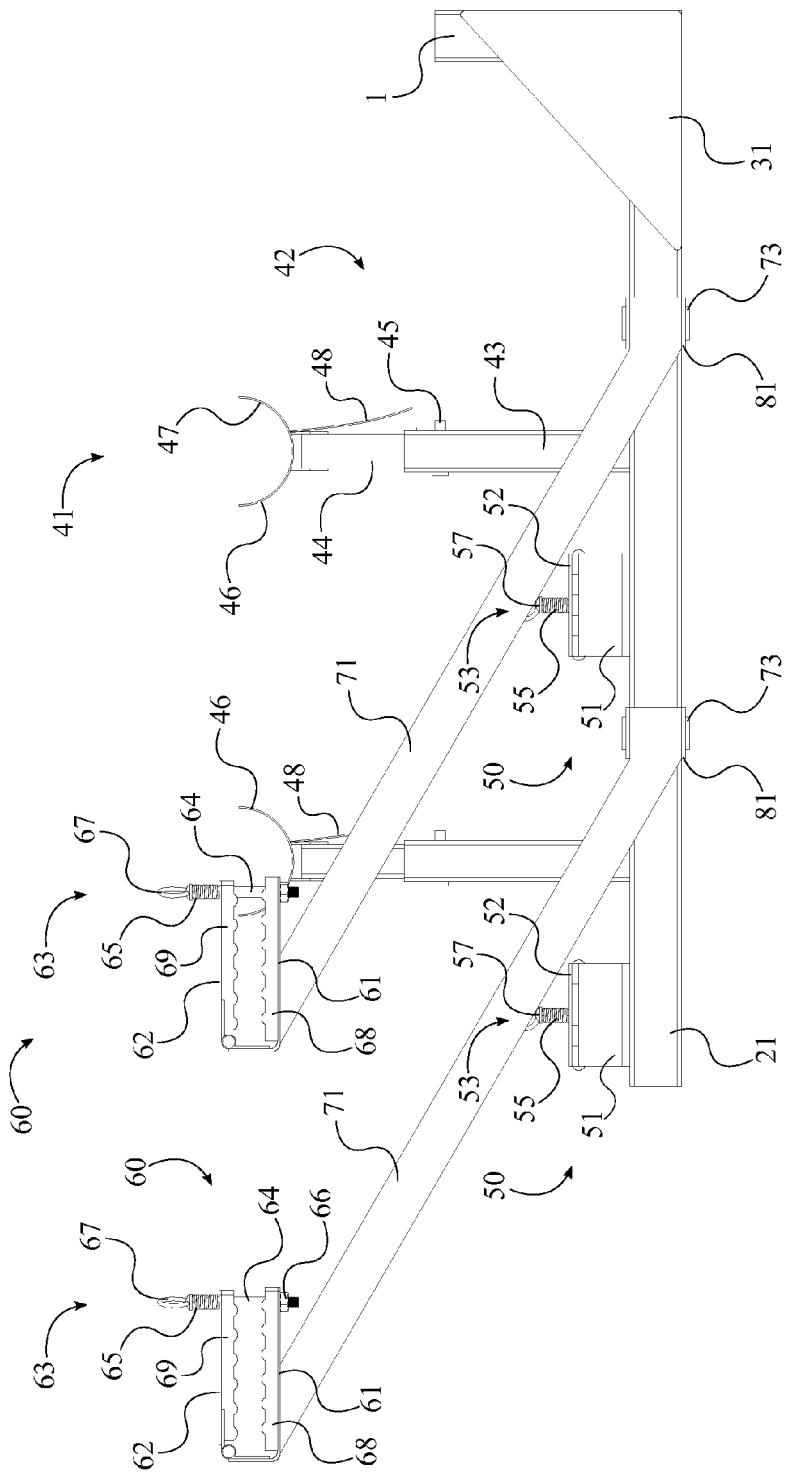
FIG. 9 is a right side elevational view of the present invention, wherein the pedal arm for each of the plurality of bicycle-receiving subassemblies is retracted.
Figure 10:
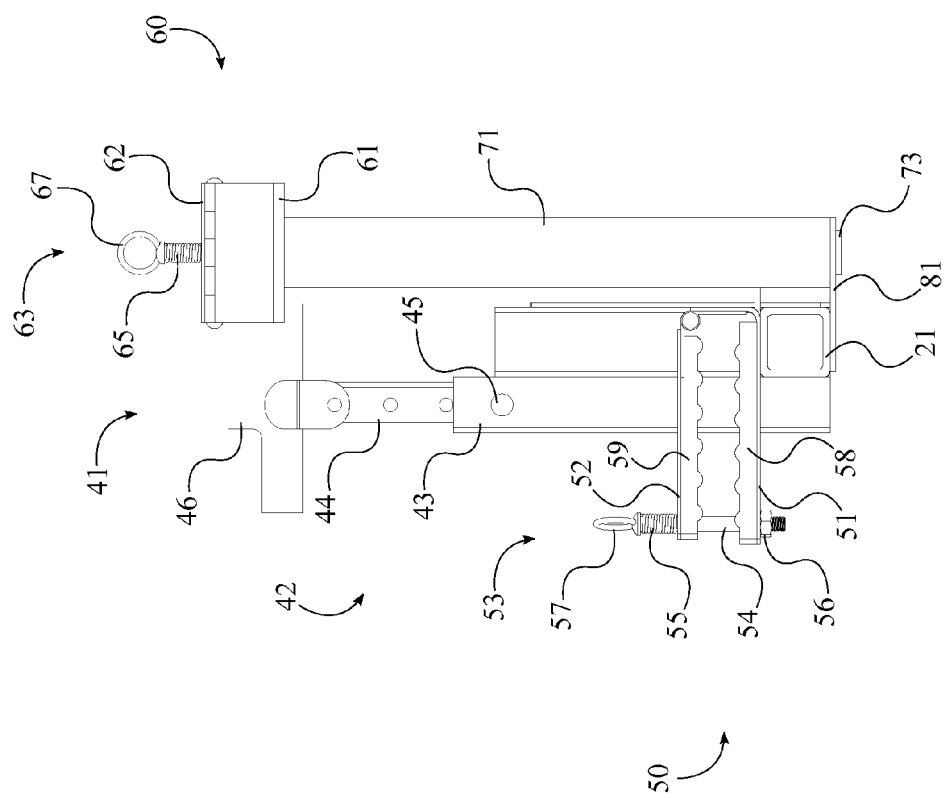
FIG. 10 is a front elevational view of the present invention, wherein the pedal arm for each of the plurality of bicycle-receiving subassemblies is retracted.

In reference to FIG. 1, the plurality of bicycle-receiving subassemblies 4 is positioned along the main body 2, wherein each of the plurality of bicycle-receiving subassemblies 4 is capable of securing a bicycle at multiple points (i.e. the pedals and the down tube). To this end, each of the plurality of bicycle-receiving subassemblies 4 comprises a frame-receiving cradle 41, a first pedal-receiving clamp 50, a second pedal-receiving clamp 60, and a pedal arm 71. The first pedal-receiving clamp 50, the frame-receiving cradle 41, and the pedal arm 71 are adjacently connected to the main body 2, wherein the frame-receiving cradle 41 is positioned in between the first pedal-receiving clamp 50 and the pedal arm 71, as depicted in FIG. 3. The second pedal-receiving clamp 60 is adjacently connected to the pedal arm 71, and is positioned along the pedal arm 71 opposite the main body 2, wherein the pedal arm 71 horizontally and vertically offsets the second pedal-receiving clamp 60 from the first pedal-receiving clamp 50, as depicted by FIG. 6-7. The first pedal-receiving clamp 50 and the second pedal-receiving clamp 60 provide a means for supporting the pedals of the bicycle, while the frame-receiving cradle 41 supports the down tube of the bicycle.

Figure 11:
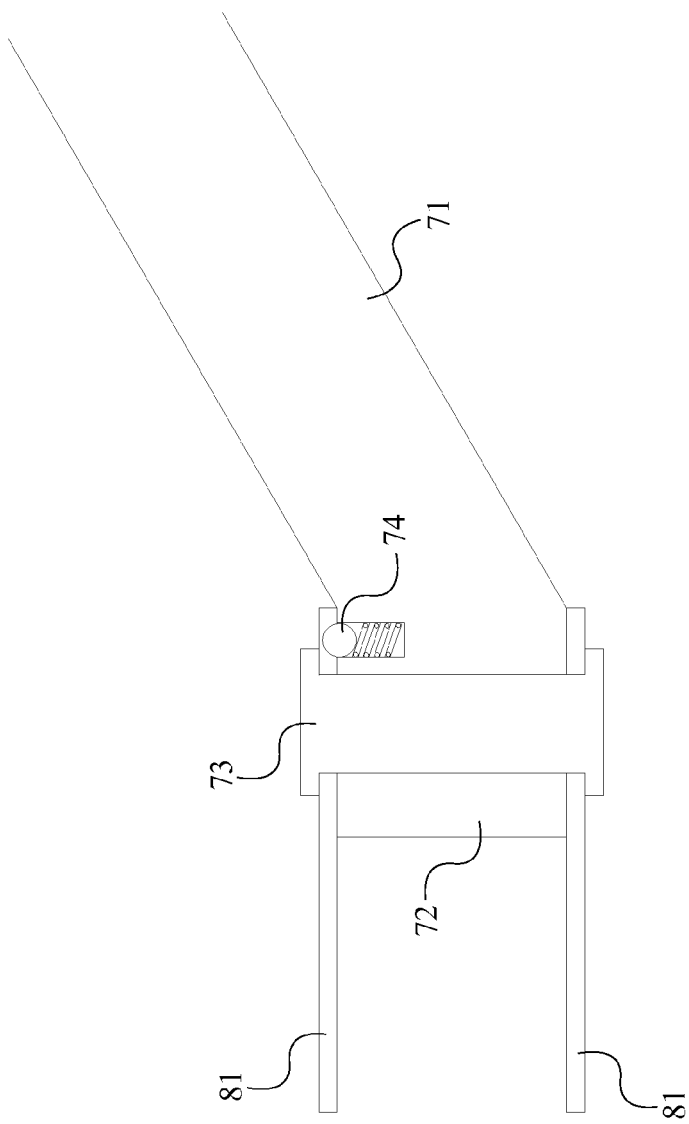
FIG. 11 is a front sectional view of the pedal arm showing the internal lock pin.

In the preferred embodiment of the present invention, the pedal arm 71 is pivotally connected to the main body 2, wherein each of the plurality of bicycle-receiving subassemblies 4 further comprises an at least one flange 81, and the pedal arm 71 comprises a pivot block 72, a bolt 73, and a lock pin 74. The at least one flange 81 is adjacently connected to the main body 2 and extends away from the main body 2. The pivot block 72 is positioned along the pedal arm 71 opposite the second pedal-receiving clamp 60, adjacent to the main body 2. The bolt 73 traverses through the at least one flange 81 and the pivot block 72, wherein the pedal arm 71 is pivotally connected to the main body 2. The lock pin 74 engages the pivot block 72 and the at least one flange 81, securing the pedal arm 71 in either a perpendicular or parallel position relative to the main body 2. Ideally the lock pin 74 is integrated into the pivot block 72 and the at least one flange 81 as a ball detent as depicted in FIG. 11, however, other variations are possible. The pivotal nature of the pedal arm 71 allows the present invention to become more compact when the pedal arm 71 is positioned parallel to the main body 2, thus decreasing the storage size when the present invention is not in use. This can be seen by comparing FIG. 3-6 to FIG. 8-10.

Figure 4:
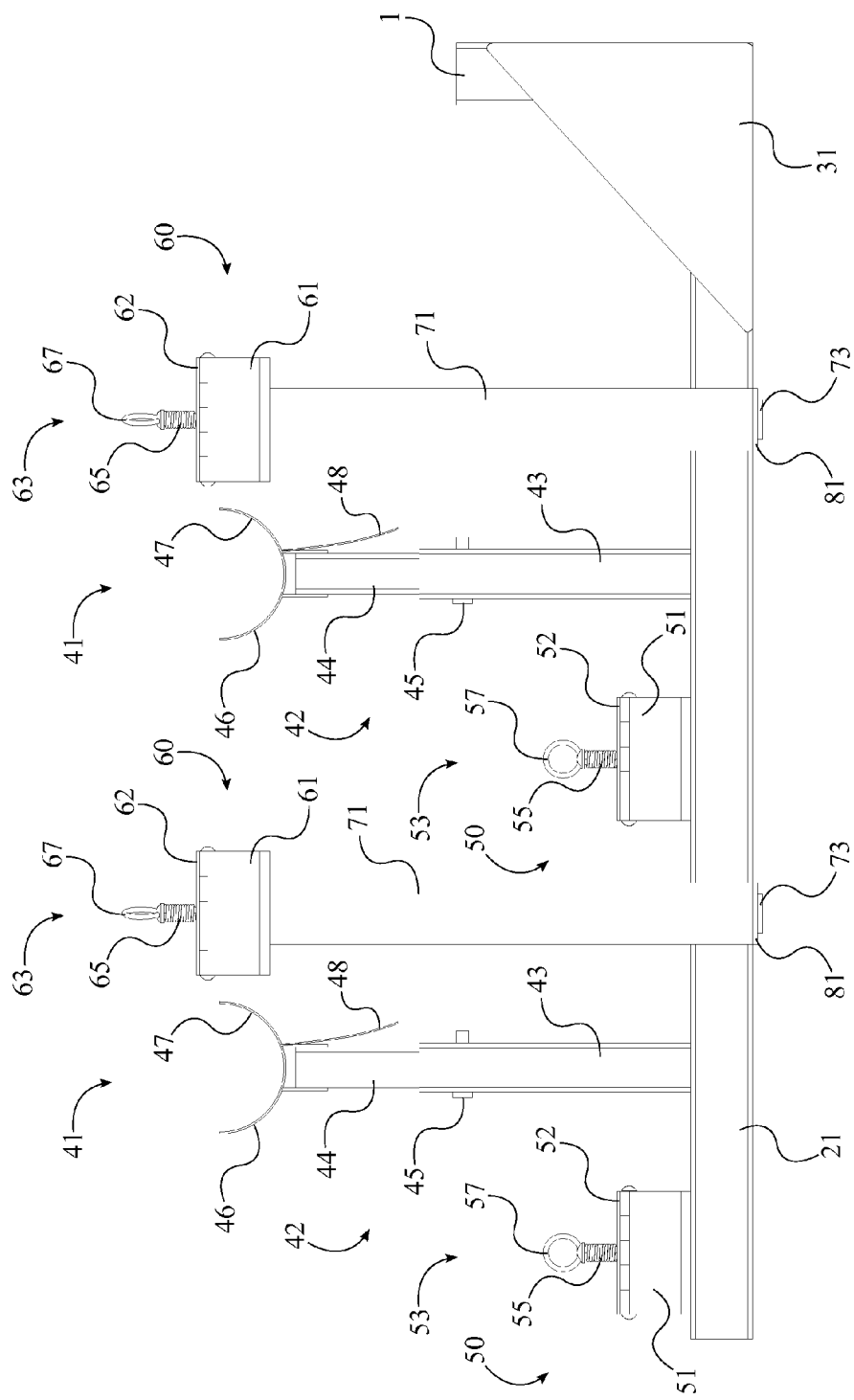
FIG. 4 is a right side elevational view of the present invention, wherein the pedal arm for each of the plurality of bicycle-receiving subassemblies is fanned out.
Figure 5:
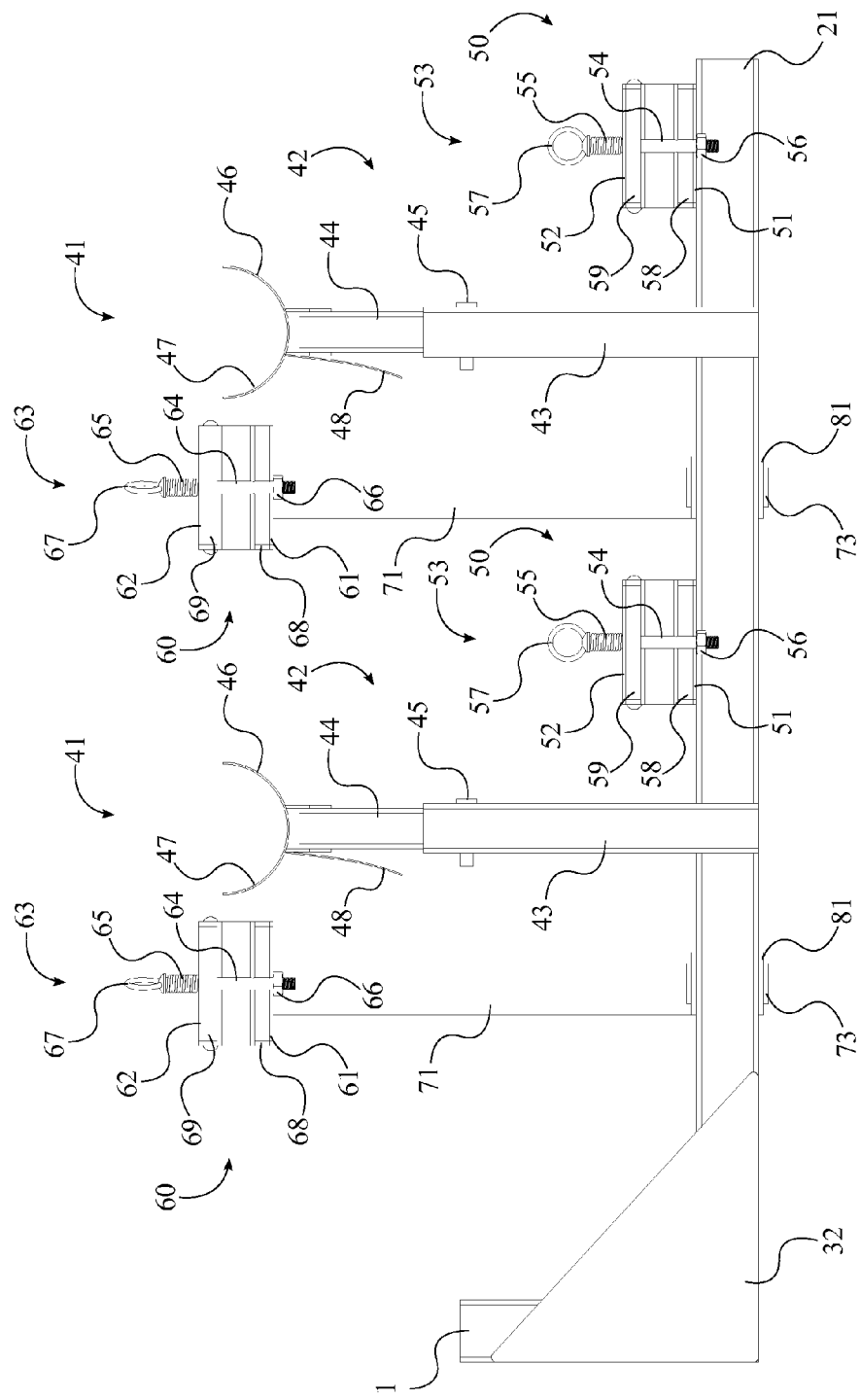
FIG. 5 is a left side elevational view of the present invention, wherein the pedal arm for each of the plurality of bicycle-receiving subassemblies is fanned out.

In reference to FIG. 4-5, the frame-receiving cradle 41 comprises an extension member 42 and a frame brace 46. The frame brace 46 is a cradle structure that supports the down tube, while the extension member 42 is a support that offsets the frame brace 46 from the main body 2. As such, the extension member 42 is adjacently connected to the main body 2, while the frame brace 46 is adjacently connected to the extension member 42 opposite the main body 2. Furthermore, the frame brace 46 is pivotally connected to the extension member 42 in order to support any bicycle, as the down tube of each bicycle may be angled differently. Additionally, the pivotal connection of the frame brace 46 allows the bicycle being secured to be rotated about the longitudinal axis 9 in order to offset the handle bars of each adjacent bicycle. The frame brace 46 comprises a plurality of cradle sections, wherein each of the plurality of cradle sections has a different radius. The plurality of cradle sections further lends the frame brace 46 to being compatible with any type of bicycle.

In the preferred embodiment of the present invention, the extension member 42 is a telescoping structure that allows the height of the frame brace 46 to be adjusted, wherein the extension member 42 comprises a cradle base 43, a cradle arm 44, and an adjustment pin 45. In reference to FIG. 4-5, the cradle base 43 is adjacently connected to the main body 2 and the cradle arm 44 is slidably connected to the cradle base 43, while the frame brace 46 is adjacently connected to the cradle arm 44 opposite the main body 2. The cradle arm 44 can be positioned into or around the cradle base 43. The cradle base 43 is positioned perpendicular to the main body 2, such that the frame brace 46 moves in a vertical direction when the cradle arm 44 is slid along the cradle base 43. The ability to adjust the height of the frame brace 46 further enhances the ability of the present invention to support any bicycle and assists in offsetting the handlebars of adjacent bicycles from each other. The adjustment pin 45 is used to lock the cradle arm 44 in position along the cradle base 43, wherein the adjustment pin 45 is positioned through both the cradle arm 44 and the cradle base 43.

In further reference to FIG. 4-5, the frame-receiving cradle 41 further comprises a frame cushioning surface 47 and a frame strap 48. The frame cushioning surface 47 is positioned about the frame brace 46 opposite the extension member 42, wherein the frame cushioning surface 47 provides the point of contact between the frame-receiving cradle 41 and the bicycle. The frame cushioning surface 47 acts to minimize the impact to the bicycle frame while the bicycle is being supported and ultimately serves to protect against dings, scratches, and other damage to the bicycle frame that can often occur from transporting bicycles. The frame strap 48 is adjacently connected to the frame brace 46 and provides a means for securing the down tube to the frame brace 46. In the preferred embodiment of the present invention, the frame strap 48 comprises utilizes a hook and loop fastener, wherein the frame strap 48 is fixed to the frame brace 46 at one end, while a free end of the frame strap 48 is wrapped around the down tube and attached to the body of the frame strap 48. It is also possible for the frame strap 48 to use alternative fastening means in other embodiments of the present invention.

In reference to FIG. 6-7, the first pedal-receiving clamp 50 comprises a first jaw 51, a second jaw 52, and a first jaw fastener 53. The first jaw 51 is adjacently and directly connected to the main body 2, while the second jaw 52 is hingedly connected to the first jaw 51 opposite the main body 2. Together the first jaw 51 and the second jaw 52 form a first clamp mouth into which a pedal of the bicycle is positioned and secured. In the preferred embodiment of the present invention, the first clamp mouth is oriented away from the main body 2, however, it is possible for the first clamp mouth to be oriented adjacent to the main body 2 in other embodiments of the present invention. Once the pedal has been appropriately positioned in between the first jaw 51 and the second jaw 52, the first pedal-receiving clamp 50 can be tightened to secure the pedal. The first jaw 51 and the second jaw 52 are secured closed around the pedal using the first jaw fastener 53, which engages both the first jaw 51 and the second jaw 52.

In the preferred embodiment of the present invention, the first jaw fastener 53 is a spring-loaded latch pin and comprises a first pin 54, a first spring 55, a first catch 56, and a first stop 57. In reference to FIG. 6-7, the first stop 57 is terminally connected to the first pin 54 and the first catch 56 is adjacently connected to the first pin 54 opposite the first stop 57, while the first spring 55 is positioned around the first pin 54. The first pin 54 traverses through the second jaw 52, wherein the first spring 55 is positioned in between the second jaw 52 and the first stop 57. When the pedal is positioned in between the first jaw 51 and the second jaw 52, the first pin 54 is pulled towards the first jaw 51, compressing the first spring 55 between the second jaw 52 and the first stop 57. The first pin 54 is then inserted into a notch in the first jaw 51, wherein the first catch 56 engages the first jaw 51, thus clenching together the first jaw 51 and the second jaw 52.

In further reference to FIG. 6-7, the first pedal-receiving clamp 50 further comprises a first pedal cushioning surface 58 and a second pedal cushioning surface 59. The first pedal cushioning surface 58 is positioned about the first jaw 51 opposite the main body 2, while the second pedal cushioning surface 59 is positioned about the second jaw 52. Together the first pedal cushioning surface 58 and the second pedal cushioning surface 59 encompass the first clamp mouth, wherein the first pedal cushioning surface 58 and the second pedal cushioning surface 59 provide the point of contact for engaging the pedal. Similar to the frame cushioning surface 47, the first pedal cushioning surface 58 and the second pedal cushioning surface 59 act to minimize the impact to the pedal while the bicycle is being supported, and ultimately serve to protect against dings, scratches, and other damage to the pedal that can often occur from transporting bicycles. Additionally, the first pedal cushioning surface 58 and the second pedal cushioning surface 59 provide better grip, boosting the securing capabilities of the first pedal-receiving clamp 50 even more.

In reference to FIG. 6-7, the second pedal-receiving clamp 60 comprises a third jaw 61, a fourth jaw 62, and a second jaw fastener 63. The third jaw 61 is adjacently and directly connected to the pedal arm 71, while the fourth jaw 62 is hingedly connected to the third jaw 61 opposite the pedal arm 71. Together the third jaw 61 and the fourth jaw 62 form a second clamp mouth into which a subsequent pedal of the bicycle is positioned and secured. In the preferred embodiment of the present invention, the second clamp mouth is oriented towards the main body 2 (i.e. same direction as the first clamp mouth). It is also possible for the second clamp mouth to be oriented away from the main body 2 in other embodiments of the present invention, however, the second clamp mouth is ideally oriented in the same direction as the first clamp mouth. Once the subsequent pedal has been appropriately positioned in between the third jaw 61 and the fourth jaw 62, the second pedal-receiving clamp 60 can be tightened to secure the subsequent pedal. The third jaw 61 and the fourth jaw 62 are secured closed around the subsequent pedal using the second jaw fastener 63, which engages both the third jaw 61 and the fourth jaw 62.

In the preferred embodiment of the present invention, the second jaw fastener 63 is a spring-loaded latch pin and comprises a second pin 64, a second spring 65, a second catch 66, and a second stop 67. In reference to FIG. 6-7, the second stop 67 is terminally connected to the second pin 64 and the second catch 66 is adjacently connected to the second pin 64 opposite the second stop 67, while the second spring 65 is positioned around the second pin 64. The second pin 64 traverses through the fourth jaw 62, wherein the second spring 65 is positioned in between the fourth jaw 62 and the second stop 67. When the subsequent pedal is positioned in between the third jaw 61 and the fourth jaw 62, the second pin 64 is pulled towards the third jaw 61, compressing the second spring 65 between the fourth jaw 62 and the second stop 67. The second pin 64 is then inserted into a notch in the third jaw 61, wherein the second catch 66 engages the third jaw 61, thus clenching together the third jaw 61 and the fourth jaw 62.

In further reference to FIG. 6-7, the second pedal-receiving clamp 60 further comprises a third pedal cushioning surface 68 and a fourth pedal cushioning surface 69. The third pedal cushioning surface 68 is positioned about the third jaw 61 opposite the pedal arm 71, while the fourth pedal cushioning surface 69 is positioned about the fourth jaw 62. Together the third pedal cushioning surface 68 and the fourth pedal cushioning surface 69 encompass the second clamp mouth, wherein the third pedal cushioning surface 68 and the fourth pedal cushioning surface 69 provide the point of contact for engaging the subsequent pedal. Similar to the first pedal cushioning surface 58 and the second pedal cushioning surface 59, the third pedal cushioning surface 68 and the fourth pedal cushioning surface 69 act to minimize the impact to the subsequent pedal while the bicycle is being supported, and ultimately serve to protect against dings, scratches, and other damage to the subsequent pedal that can often occur from transporting bicycles. Additionally, the third pedal cushioning surface 68 and the fourth pedal cushioning surface 69 provide better grip, boosting the securing capabilities of the second pedal-receiving clamp 60 even more.

The frame brace 46 receives the frame of bicycle and can rotate about the longitudinal axis 9 even as the pedals of the bicycle are secured by the first pedal-receiving clamp 50 and the second pedal receiving clamp. This allows the angle of the bicycle to be adjusted, which is especially important when using the present invention with multiple bicycles. By using the frame brace 46 to orient each bicycle at a different angle, a user can ensure that the handlebars of each bicycle are offset from the handle bars of adjacent bicycles. For example, a first bicycle may be secured at a 0 degree angle, e.g. parallel to the ground. A second bicycle may be angled upwards at 30 degrees, resulting in its handlebars being offset from the handlebars of the first bicycle in both a vertical and horizontal direction. Since the handlebars are offset from each other they will not hit or bump each other during transport, reducing wear and tear which is normally encountered when using regular bicycle carriers to transport more than one bicycle. The height-adjustable nature of the frame brace 46 additionally affords the present invention the ability to essentially eliminate transport related damage via a fanned configuration of bicycles, heretofore unseen in the prior art.

Figure 2:
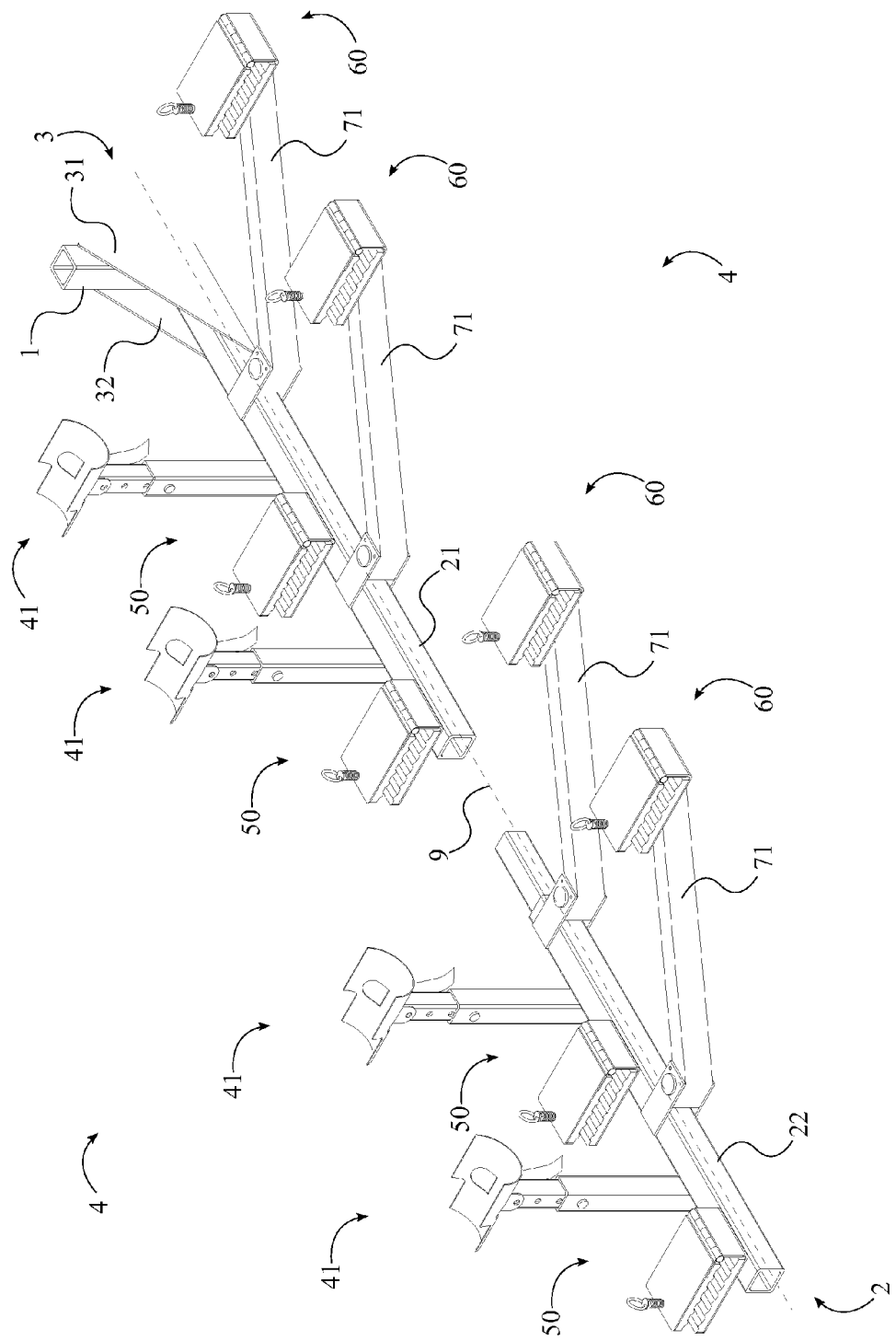
FIG. 2 is a perspective view of the present invention, wherein the secondary beam is detached from the primary beam.

While the present invention could potentially be used for any number of bicycles, the exact number of bicycles that need to be transported may vary from time to time. As such, in the preferred embodiment of the present invention, the main body 2 comprises a primary beam 21 and a secondary beam 22. In reference to FIG. 1-2, the secondary beam 22 can be attached to or detached from the primary beam 21 as needed, effectively extending or reducing the length of the main body 2 and increasing or reducing the transport capacity. In the preferred embodiment, the number of the plurality of bicycle-receiving subassemblies 4 positioned along both the primary beam 21 and the secondary beam 22 is specifically two, however, the number may vary in other embodiments of the present invention. The secondary beam 22 can be secured to the primary beam 21 using a fastening pin similar to the adjustment pin 45 of the extension member 42, a bolt and nut and washer combination, or any similar fastening means. The provision of the secondary beam 22 allows for storage capacity to be increased when necessary without unnecessarily increasing the size of the present invention. Potentially, multiple secondary beams can be attached to provide even greater capacity, although care must be taken to not add so many secondary beams that the resulting stress is greater than the tolerances of the present invention.

A description of how bicycles are secured to the present invention now follows. First the present invention is secured to a vehicle by means of the mounting section 1. Next, the bicycles are prepared for loading in order from heaviest to lightest; this is so that the heaviest bicycle is placed closest to the vehicle hitch, minimizing torque and stress experienced by the present invention. Bicycle placement entails orienting the bicycle such that the front wheel faces vehicle left (i.e. driver's side) and the rear wheel faces vehicle right (i.e. passenger side). The pedals are then simultaneously placed into the first pedal-receiving clamp 50 and the second pedal-receiving clamp 60, after which the down tube is placed onto the frame brace 46. The bicycle is then secured by engaging the first jaw fastener 53 and the second jaw fastener 63, and by wrapping the frame strap 48 around the down tube and the frame brace 46. To adjust the bicycle height and angle (i.e. "fan out") the bicycle is raised or lowered by means of the cradle arm 44, which can be extended out of or retracted towards the cradle base 43 while the adjustment pin 45 of the extension member 42 is removed. The adjustment pin 45 of the extension member 42 is then reinserted to secure the frame brace 46 in the new desired position. This securing process is then repeated for each bicycle which is to be transported by the present invention.

Although the invention has been explained in relation to its preferred embodiment, it is to be understood that many other possible modifications and variations can be made without departing from the spirit and scope of the invention as hereinafter claimed.

What is claimed is:

1. A bicycle rack comprises:
a mounting section;
a main body;
a plurality of bicycle-receiving subassemblies;
each of the plurality of bicycle-receiving subassemblies comprises a frame-receiving cradle, a first pedal-receiving clamp, a second pedal-receiving clamp, and a pedal arm;
the mounting section being terminally connected to the main body;
the plurality of bicycles-receiving subassemblies being positioned along the main body;
the frame-receiving cradle, the first pedal-receiving clamp, and the pedal arm being adjacently connected to the main body;
the frame-receiving cradle being positioned in between the first pedal-receiving clamp and the pedal arm;
the second pedal-receiving clamp being adjacently connected to the pedal arm; and
the second pedal-receiving clamp being positioned along the pedal arm opposite the main body.

2. The bicycle rack as claimed in claim 1 comprises:
a hitch brace; and
the hitch brace being adjacently connected to both the mounting section and the main body.

3. The bicycle rack as claimed in claim 2 comprises:
the hitch brace comprises a first plate and a second plate; and
the first plate and the second plate being positioned opposite each other about the mounting section and the main body.

4. The bicycle rack as claimed in claim 1 comprises:
a hitch brace; and
the mounting section being positioned perpendicular to the main body.

5. The bicycle rack as claimed in claim 1 comprises:
the main body comprises a primary beam and a secondary beam; and
the secondary beam being attached to the primary beam opposite the mounting section.

6. The bicycle rack as claimed in claim 1 comprises:
the frame-receiving cradle comprises an extension member and a frame brace;
the extension member being adjacently connected to the main body; and
the frame brace being adjacently connected to the extension member opposite the main body.

7. The bicycle rack as claimed in claim 6 comprises:
the extension member comprises a cradle base and a cradle arm;
the cradle base being adjacently connected to the main body;
the cradle arm being slidably connected to the cradle base; and
the frame brace being adjacently connected to the cradle arm opposite the main body.

8. The bicycle rack as claimed in claim 6 comprises:
the frame brace being pivotally connected to the extension member.

9. The bicycle rack as claimed in claim 6 comprises:
the frame-receiving cradle further comprises a frame cushioning surface; and
the frame cushioning surface being positioned about the frame brace opposite the extension member.

10. The bicycle rack as claimed in claim 6 comprises:
the frame-receiving cradle further comprises a frame strap; and
the frame strap being adjacently connected to the frame brace.

11. The bicycle rack as claimed in claim 1 comprises:
the first pedal-receiving clamp comprises a first jaw and a second jaw;
the first jaw being adjacently connected to the main body; and
the second jaw being hingedly connected to the first jaw opposite the main body.

12. The bicycle rack as claimed in claim 11 comprises:
the first pedal-receiving clamp further comprises a first jaw fastener; and
the first jaw fastener engaging the first jaw and the second jaw, wherein the first jaw fastener clenches together the first jaw and the second jaw.

13. The bicycle rack as claimed in claim 11 comprises:
the first pedal-receiving clamp further comprises a first pedal cushioning surface and a second pedal cushioning surface;
the first pedal cushioning surface being positioned about the first jaw opposite the main body; and
the second pedal cushioning surface being positioned about the second jaw.

14. The bicycle rack as claimed in claim 1 comprises:
the second pedal-receiving clamp comprises a third jaw and a fourth jaw;
the third jaw being adjacently connected to the pedal arm; and
the fourth jaw being hingedly connected to the third jaw opposite the pedal arm.

15. The bicycle rack as claimed in claim 14 comprises:
the second pedal-receiving clamp further comprises a second jaw fastener; and the second jaw fastener engaging the third jaw and the fourth jaw, wherein the second jaw fastener clenches together the third jaw and the fourth jaw.

16. The bicycle rack as claimed in claim 14 comprises:

the second pedal-receiving clamp further comprises a third pedal cushioning surface and a fourth pedal cushioning surface;

the third pedal cushioning surface being positioned about the third jaw opposite the pedal arm; and the fourth pedal cushioning surface being positioned about the fourth jaw.

17. The bicycle rack as claimed in claim 1 comprises:

the pedal arm being pivotally connected to the main body.

18. A bicycle rack comprises:

a mounting section;

a main body;

a plurality of bicycle-receiving subassemblies;

each of the plurality of bicycle-receiving subassemblies comprises a frame-receiving cradle, a first pedal-receiving clamp, a second pedal-receiving clamp, and a pedal arm;

the frame-receiving cradle comprises an extension member and a frame brace;

the first pedal-receiving clamp comprises a first jaw and a second jaw;

the second pedal-receiving clamp comprises a third jaw and a fourth jaw;

the extension member comprises a cradle base and a cradle arm;

the mounting section being terminally connected to the main body;

the plurality of bicycles-receiving subassemblies being positioned along the main body;

the cradle base, the first pedal-receiving clamp, and the pedal arm being adjacently connected to the main body;

the pedal arm being pivotally connected to the main body;

the frame-receiving cradle being positioned in between the first pedal-receiving clamp and the pedal arm;

the second pedal-receiving clamp being adjacently connected to the pedal arm;

the second pedal-receiving clamp being positioned along the pedal arm opposite the main body;

the cradle arm being slidably connected to the cradle base;

the frame brace being pivotally connected to the extension member;

the frame brace being adjacently connected to the cradle arm opposite the main body;

the first jaw being adjacently connected to the main body;

the second jaw being hingedly connected to the first jaw opposite the main body;

the third jaw being adjacently connected to the pedal arm; and the fourth jaw being hingedly connected to the third jaw opposite the pedal arm.

19. The bicycle rack as claimed in claim 18 comprises:

the first pedal-receiving clamp further comprises a first jaw fastener; and the first jaw fastener engaging the first jaw and the second jaw, wherein the first jaw fastener clenches together the first jaw and the second jaw.

20. The bicycle rack as claimed in claim 18 comprises:

the second pedal-receiving clamp further comprises a second jaw fastener; and the second jaw fastener engaging the third jaw and the fourth jaw, wherein the second jaw fastener clenches together the third jaw and the fourth jaw.

* * * * *